United States Patent [19]

Grubber

[11] 3,860,711

[45] Jan. 14, 1975

[54] SYNERGISTIC INSECTICIDAL COMPOSITION CONTAINING DIPROPARGYL PHENYLPHOSPHONATE

[75] Inventor: Michael J. Grubber, Racine, Wis.

[73] Assignee: S. C. Johnson & Son, Racine, Wis.

[22] Filed: Oct. 31, 1972

[21] Appl. No.: 302,449

Related U.S. Application Data

[63] Continuation-in-part of Ser. No. 33,529, April 30, 1970, abandoned.

[52] U.S. Cl................. 424/200, 424/210, 424/213, 424/218, 424/219
[51] Int. Cl.............................................. A01n 9/36
[58] Field of Search............................ 424/200, 219

[56] References Cited

UNITED STATES PATENTS 3,555,123   1/1971   Fischer et al. ...................... 424/219

OTHER PUBLICATIONS

Bulletin of Ent. Society of America, Vol. 15, No. 2 (1969).

Primary Examiner—Vincent D. Turner

[57] ABSTRACT

A composition having improved insecticidal properties is obtained by synergizing a phosphorous-containing insecticide with dipropargyl phenyl-phosphonate.

12 Claims, No Drawings

SYNERGISTIC INSECTICIDAL COMPOSITION CONTAINING DIPROPARGYL PHENYLPHOSPHONATE

The application is a continuation-in-part of Grubber U.S. Ser. No. 33,529, filed Apr. 30, 1970 now abandoned.

This invention relates to a synergistic insecticidal composition. In one of its more specific aspects, this invention relates to a synergistic insecticidal composition comprising a phosphorous-containing insecticide and dipropargyl phenylphosphonate.

The insecticide industry is continually evaluating compounds to improve the activity of insecticides. These compounds are referred to as "synergists," and an insecticidal composition containing a synergist is referred to as a "synergistic insecticidal composition." The insecticidal activity of such a composition is greater than the sum of the activity of the insecticide and the synergist. (In general, synergists have essentially no insecticidal activity at the concentrations employed in the insecticidal compositions.) However, for various reasons, the discovery of a synergist is not an easy task.

U.S. Pat. No. 3,555,123 discloses the use of di-2-propynyl phenylphosphonate (another name for dipropargyl phenylphosphonate) as a synergist for allethrin, a pyrethroid insecticide. However, as is well known to those skilled in this art, many synergists for pyrethroids are not effective synergists for non-pyrethroids such as phosphorous-containing insecticides.

It is an object of this invention to provide a synergistic insecticidal composition. Another object of this invention is to provide a synergistic insecticidal composition comprising a phosphorous-containing insecticide and dipropargyl phenylphosphonate. A further object of this invention is to provide a synergist for phosphorous-containing insecticides. A further object of this invention is to provide a process for killing insects. Other objects of this invention will appear herein.

These and other objects are attained by the practice of this invention, at least one embodiment of which comprises providing a synergistic insecticidal composition comprising dipropargyl phenylphosphonate and a phosphorous-containing insecticide selected from the group consisting of:

O,O-diethyl-O-(3,5,6-trichloro-2-pyridyl) phosphorothioate (available from Dow Chemical Co. as "Dursban");

phenylglyoxylonitrile oxime O,O-diethyl phosphorothioate (available from Farbenfabriken Bayer AG as "Valexon");

O,O-dimethyl-O-(3,5,6-trichloro-2-pyridyl) phosphorothioate (available from Dow as "Dowco" 214);

dimethyl 3,5,6-trichloro-2-pyridyl phosphate (available from Dow as "Dowco" 217);

O,O-dimethyl-O-(2-methoxy-4-cyanophenyl) phosphorothioate (hereinafter referred to as "Phosphate A");

O,O-dimethyl-O-(4-nitro-m-tolyl) phosphorothioate (available from Sumitomo Chemical Co., Ltd., as "Sumithion")

O,O-dimethyl-S-phthalimidomethyl phosphorodithioate (available from Stauffer Chemical Co. as "Imidan");

O,O-diethyl-O-(2-isopropyl-4-methyl-6-pyrimidyl) phosphorothioate (available from Geigy Chemical Corp. as "Diazinon"); and O,O-dimethyl dithiophosphate of diethyl mercaptosuccinate (available from American Cyanamid Co. as "Malathion").

Another embodiment of this invention comprises providing a process for killing insects, said process comprising contacting said insects with an insecticidally effective amount of a synergistic insecticical composition as described in the immediately preceding paragraph.

Dipropargyl phenylphosphonate is an ester having the structural formula:

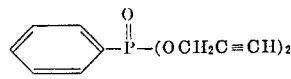

With the exception of O,O-dimethyl-O-(2-methoxy-4-cyanophenyl) phosphorothioate, the phosphorous-containing insecticides synergized by dipropargyl phenylphosphonate in this invention are more particularly described (scientific, common and trade names; empirical formulas; chemical structures; manufacturers, etc.) in the booklet entitled "Commercial and Experimental Organic Insecticides," 1971 Revision, by Eugene E. Kenaga and William E. Allison. This booklet is a reprint from the *Bulletin of the Entomological Society of America*, Volume 15, No. 2 (June 1969) as revised in Volume 16, No. 1 (March 1970). In view of this booklet, the structure and preparation of these phosphorous-containing insecticides need not be detailed herein.

The structure and general method of preparing O,O-dimethyl-O-(2-methoxy-4-cyanophenyl) phosphorothioate are referenced in *Chemical Abstracts*, Volume 63, 17969h (1965).

This invention also encompasses the preparation of a synergistic insecticidal composition wherein (1) a mixture of two or more of the above-described phosphorous-containing insecticides is used and/or (2) a second synergist is used in combination with dipropargyl phenylphosphonate. The second synergist may be one of the known synergists, examples of which are safrole (4 allyl-1,2-methylenedioxybenzene), isosafrole (4-propenyl-1,2-methylenedioxybenzene), dihydrosafrole (4-n-propyl-1,2-methylenedioxybenzene), piperonyl butoxide, and derivatives thereof.

Synergistic insecticidal compositions are obtained in accordance with this invention wherein the weight ratio of the phosphorous-containing insecticide to dipropargyl phenylphosphonate is from about 1:1 to about 1:10.

Minor amounts of other substances may be added to the compositions of this invention in order to attain particular functional or esthetic effects. Examples of such substances are perfumes, corrosion inhibitors, buffering agents, fillers, wetting agents, flame retardants, antioxidants, emulsifiers, ultraviolet radiation absorbers, and disinfectants.

The synergistic insecticidal compositions of this invention may be formulated in a number of ways to permit convenient application by the user. For example, they may preferably be made up as pressurized compositions in which the composition in the can is in the form of an oil-in-water emulsion, a water-in-oil emulsion, or a solution. Such pressurized compositions may be prepared to give space sprays or surface sprays. Pressurization can be accomplished with any of the propellants used in the art, including liquefiable hydrocarbons (such as propane, butane, and isobutane); liquefiable fluorinated alkanes (such as dichlorodifluoromethane, difluoroethane, and tetrafluoroethane); and compressible inert gases (such as nitrous oxide, carbon dioxide, and nitrogen).

Pressurized solvent formulations may be prepared by dissolving the phosphorous-containing insecticide and the synergist in a suitable solvent, such as ethanol, naphtha, or mineral spirits and pressurizing with one of the aforementioned propellants.

Oil-in-water formulations may be prepared by emulsifying the phosphorous-containing insecticide and any other hydrophobic components in water and pressurizing with one of the above-noted propellants.

These compositions can also be formulated for use in hand sprayers, pump sprayers, foggers, and the like. These non-pressurized formulations can be in the form of water-in-oil emulsions, oil-in-water emulsions, or solutions and are prepared similarly to the pressurized compositions except for the omission of the propellant.

This invention will be further illustrated by the following examples of preferred embodiments. However, it will be understood that these examples are included for purposes of illustration and are not intended to limit the scope of this invention.

Preparation of Dipropargyl Phenylphosphonate

A 2,000 ml. flask equipped with stirrer, condenser (drying tube), and addition funnel is charged with 28.0 g. (0.50 mole) propargyl alcohol, 50.6 g. (0.50 mole) triethylamine, and 1,000 ml. diethyl ether. The solution is cooled in an ice-water bath, and 48.8 g. (0.25 mole) phenylphosphonic dichloride in 150 ml. ether is added slowly to the stirred, cooled solution (4 hrs.). The white solids are filtered from the reaction mixture and washed with ether. The ether solution was washed with water (2 × 100 ml.) saturated sodium bicarbonate (3 × 100 ml.) and dried over anhydrous magnesium sulfate. The ether is removed, and the crude ester is vaccum-distilled. The ester has a boiling point of 141° to 142° C. (0.14 mm.) and, $n_D^{22}$ 1.5254. The structure of dipropargyl phenylphosphonate is confirmed by nuclear magnetic resonance and infrared spectra.

EXAMPLE 1

A synergistic insecticidal composition is prepared by dissolving one part Dursban and four parts dipropargyl phenylphosphonate in ethanol. Bioassays that establish the male German roach and female housefly mortalities are conducted by applying 0.5 microliter of the composition on the insect's ventral abdomen. Each test is replicated twice with 25 male German roaches and 25 female houseflies that have been anesthetized with carbon dioxide. Mortality readings are recorded 24 hours after the initial treatment. The following results are obtained:

|  | $LD_{50}$ | |
| --- | --- | --- |
|  | H.F. | G.R. |
| Dursban alone | .035 | .149 |
| Dursban + DIPP | .016 | .044 |
| Synergistic ratio | 2.21 | 3.39 |

H.F. = female houseflies
G.R. = male German roaches
Synergistic ratio = ($LD_{50}$ insecticide alone)/($LD_{50}$ insecticide + DIPP
DIPP = dipropargyl phenylphosphonate
$LD_{50}$ = that amount of insecticidal composition, expressed in micrograms per insect, required to kill 50 percent of the insects treated

EXAMPLE 2

The procedure of Example 1 is repeated except that Dursban is replaced by the phosphorous-containing insecticides indicated in the Table below. The following results are obtained:

TABLE

|  | $LD_{50}$ | |
| --- | --- | --- |
|  | H.F. | G.R. |
| Valexon alone | .17 | .68 |
| Valexon + DIPP | .04 | .096 |
| Synergistic Ratio | 4.39 | 7.05 |
| Dowco 214 alone | .046 | 0.27 |
| Dowco 214 + DIPP | .030 | .138 |
| Synergistic Ratio | 1.5 | 1.96 |
| Dowco 217 alone | .042 | .085 |
| Dowco 217 + DIPP | .021 | .061 |
| Synergistic Ratio | 2.0 | 1.4 |
| Phosphate A alone | 0.10 | 0.61 |
| Phosphate A + DIPP | .025 | .162 |
| Synergistic Ratio | 4.18 | 3.77 |
| Sumithion alone | .037 | 0.28 |
| Sumithion + DIPP | .015 | .098 |
| Synergistic Ratio | 2.45 | 2.84 |
| Imidan alone | .122 | 0.79 |
| Imidan + DIPP | .030 | .220 |
| Synergistic Ratio | 4.1 | 3.58 |
| Diazinon alone | .048 | .345 |
| Diazinon + DIPP | .016 | .081 |
| Synergistic Ratio | 2.93 | 4.22 |
| Malathion alone | .384 | 0.46 |
| Malathion + DIPP | .162 | .186 |
| Synergistic Ratio | 2.36 | 2.49 |

At the concentration used in the above Examples 1 and 2, dipropargyl phenylphosphonate has essentially no insecticidal activity. Therefore, it is apparent that the addition of DIPP provides a synergistic insecticidal composition useful in killing insects.

Although this invention has been described in detail with particular reference to preferred embodiments thereof, it will be understood that variations and modifications can be effected within the spirit and scope of this invention as described hereinabove and as defined in the appended claims.

I claim:

1. A synergistic insecticidal composition comprising dipropargyl phenylphosphonate and a phosphorous-containing insecticide selected from the group consisting of:

0,0-diethyl-0-(3,5,6-trichloro-2-pyridyl) phosphorothioate;

0,0-dimethyl-0-(3,5,6-trichloro-2-pyridyl) phosphorothioate;

dimethyl 3,5,6-trichloro-2-pyridyl phosphate;

0,0-dimethyl-S-phthalimidomethyl phosphorodithioate; and

O,O-diethyl-O-(2-isopropyl-4-methyl-6-pyrimidyl) phosphorothioate wherein the weight ratio of the phosphorous-containing insecticide to dipropargyl phenylphosphonate is 1:4.

2. The composition as defined by claim 1 wherein said insecticide is O,O-diethyl-O-(3,5,6-trichloro-2-pyridyl) phosphorothioate.

3. The composition as defined by claim 1 wherein said insecticide is O,O-dimethyl-O-(3,5,6-trichloro-2-pyridyl) phosphorothioate.

4. The composition as defined by claim 1 wherein said insecticide is dimethyl 3,5,6-trichloro-2-pyridyl phosphate.

5. The composition as defined by claim 1 wherein said insecticide is O,O-dimethyl-S-phthalimidomethyl phosphorodithioate.

6. The composition as defined by claim 1 wherein said insecticide is O,O-diethyl-O-(2-isopropyl-4-methyl-6-pyrimidyl) phosphorothioate.

7. A process for killing houseflies and German roaches, said process comprising contacting said insects with an insecticidally effective amount of a synergistic insecticidal composition comprising dipropargyl phenylphosphonate and a phosphorous-containing insecticide selected from the group consisting of:

O,O-diethyl-O-(3,5,6-trichloro-2-pyridyl) phosphorothioate;
O,O-dimethyl-O-(3,5,6-trichloro-2-pyridyl) phosphorothioate;
dimethyl 3,5,6-trichloro-2-pyridyl phosphate;
O,O-dimethyl-S-phthalimidomethyl phosphorodithioate; and
O,O-diethyl-O-(2-isopropyl-4-methyl-6-pyrimidyl) phosphorothioate wherein the weight ratio of the phosphorous-containing insecticide to dipropargyl phenylphosphonate is 1:4.

8. The process as defined by claim 7 wherein said insecticide is O,O-diethyl-O-(3,5,6-trichloro-2-pyridyl) phosphorothioate.

9. The process as defined by claim 7 wherein said insecticide is O,O-dimethyl-O-(3,5,6-trichloro-2-pyridyl) phosphorothioate.

10. The process as defined by claim 7 wherein said insecticide is dimethyl 3,5,6-trichloro-2-pyridyl phosphate.

11. The process as defined by claim 7 wherein said insecticide is O,O-dimethyl-S-phthalimidomethyl phosphorodithioate.

12. The process as defined by claim 7 wherein said insecticide is O,O-diethyl-O-(2-isopropyl-4-methyl-6-pyrimidyl) phosphorothioate.

* * * * *